United States Patent Office 2,804,478
Patented Aug. 27, 1957

2,804,478

CONTINUOUS OXO PROCESS FOR GASEOUS OLEFINES

Luigi Paleari, Monza, and Alessandro Negromanti, Milan, Italy, assignors to Montecatini Società Generale per l'Industria Mineraria e Chimica, a corporation of Italy No Drawing. Application November 23, 1954, Serial No. 470,808

Claims priority, application Italy December 4, 1953

6 Claims. (Cl. 260—604)

The invention relates to a process for the preparation of aldehydes which may subsequently be converted to alcohols by the so-called oxo-synthesis process. This known process involves a reaction caused by the addition of carbon monoxide and hydrogen to an olefine in the presence of a cobalt catalyst, in particular cobalt carbonyl, at temperatures between 90 and 180° C. and at pressures from 50 to 300 atm. Now particularly the invention relates to that type of oxo-synthesis in which the reaction takes place in the liquid phase.

In the continuous processes known, the reaction is carried out with an excess of synthesis gas (CO and $H_2$) over the stoichiometric quantity referred to the olefine; this excess, which is usually recycled, serves also for stirring the liquid phase and for providing good olefine-conversion yields. Now it is also known that in the oxo-synthesis technology many difficulties are encountered in the circuit of the recirculating gas and at the circulating pumps, owing to deposits due to cobalt carbonyl carried by the gas. Further, in the oxo-synthesis from light olefines, such as propylene, other inconveniences are encountered in the olefine recovery from effluent gases; in fact, because of the dilution, the recovery under pressure requires taking resort to cooling at very low temperatures or to absorption processes.

The process according to the present invention applying above all to oxo-synthesis of those olefines which are gaseous at room conditions, eliminates such inconveniences and has also other advantages which will appear from the following description. It has in fact been found that good olefine-conversion yields can be obtained in one single step also when feeding the reactants in practically stoichiometric amounts and with little excess of olefines. That is, an excess of synthesis gas in respect of the stoichiometric quantity is not needed, and the stirring can be carried out exclusively by forced liquid recirculation.

In other words, according to the present invention the process is carried out with such a quantity of synthesis gas that this gas neither allows a gaseous recirculation nor requires venting from the high pressure section, but is present only dissolved in the liquid phase at the discharge.

For this purpose, in carrying out the oxo-synthesis process according to the present invention, it is advisable to control the temperature for avoiding the stopping of the reaction in the synthesis circuit outside of the reactor, and to adjust the ratio (CO+$H_2$): olefine in the various zones of the reactor for maintaining the ratio practically constant throughout the mass.

With the process of this invention good normal olefine conversion yields are obtained, even when highly volatile olefines are treated, by feeding the synthesis gas under pressures of 100 to 300 atm. in such quantities that the unreacted gas is in the order of the amounts carried away in solution with the liquid products. The inlet of the flow of fresh gas is regulated so as to avoid any gaseous discharge at the reactor oulet.

The synthesis equipment can be designed in various ways according to the usual arrangements of chemical technology.

The stirring necessary to obtain a convenient reaction rate despite the lack of gaseous recirculation, is preferably obtained with the aid of mechanical devices, in particular by installing a pump outside the reactor, which moves the liquid mass within the reactor in a more vigorous manner than obtained by simple feeding as in the arrangements already known.

Stirrers or similar mechanical devices may also be placed inside the reactor; but it has been found that the simple liquid recirculation is sufficient to assure secure commercially satisfactory reaction rates. The regulation of the temperature in the reactor can be effected by means of a water jacket or an interior group of tubes. This permits controlling the temperature in the reaction zone by the change in boiling temperature of the water effected by varying the water pressure or preferably in the present case of liquid recirculation, by removal of the reaction heat with the aid of a cooler placed in the circuit of the recirculating liquid mass.

As auxiliary means of such temperature control, the fresh olefine and the synthesis gas are injected into the reactor at various heights so as to keep the ratio (CO+$H_2$): olefine practically constant through the mass. As mentioned, such constancy also affords the advantage of utilizing the reactor in the most complete and economical manner, especially if the reactor is very long.

Another advantage of the process according to the present invention is that it permits simplifying the synthesis section by eliminating the usual high-pressure separator. This limits the high-pressure equipment only to the reactor, closed upon itself by means of a circuit comprising a pump for the recirculation of liquids and a heat exchanger (if needed, also mechanical stirring means and an exchanger enclosed in the reactor).

This equipment, in the absence of gaseous recirculation, is completely filled with a liquid phase, with the possible exception of a gas layer at the head of the column. The following examples, serving to illustrate but not to restrict the invention, show details of the operating conditions and the yields of the process according to the present invention.

*Example 1*

11.8 kg. of propylene, 21.5 kg. of toluene and 95 g. of cobalt were introduced in an experimental reactor of about 35 l. capacity. Temperature control was secured by a boiling water jacket. The temperature was brought to 110° C. and the pressure to 250 atm. by means of synthesis gas. The pressure was maintained by a compressor. The reaction was conducted for a duration of 90 minutes, recirculating 160 l./hr. of liquid upwards in the reactor by a pump. The experiment was then repeated first with an equal charge and with a recirculation of 280 l./hr., and finally with the same charge but a recirculation of 380 l./hr. The following results were obtained:

| Recirculation, l./hr. | Conversion yields (propylene to aldehyde $C_4$) | $C_4$-aldehyde yield referred to total of products obtained, percent |
|---|---|---|
| 160 | 48 | 86 |
| 280 | 56.5 | 92 |
| 380 | 63.5 | 92.5 |

Example 2

The following materials were fed into an experimental reactor of about 35 l. capacity. Temperature control was secured by means of a boiling-water jacket and by a heat exchanger at the inlet of the reactor. The operation was continuous for 7½ hours:

Toluene _____ 5 kg./hr.
Propylene _____ 7.12 kg./hr.
Propane _____ 0.4 kg./hr.
CO _____ 3.2 Nm³/hr. (1 Nm³=1 cubic metre at 4° C. 760 mm. Hg).
H₂ _____ 3.2 Nm³/hr.
Inert _____ 0.35 Nm³/hr.
Cobalt _____ 7.5 g./kg. propylene.

The average temperature between top and bottom of the reactor was 110° C.; the pressure was 250 atm.; the liquid recirculation was 250 l./hr. The composition of the liquid was:

|  | Bottom of reactor | Top of reactor |
|---|---|---|
| Solvent_____percent by weight__ | 31.6 | 31.1 |
| Propylene_____do____ | 16.9 | 14.4 |
| Propane_____do____ | 2.55 | 2.50 |
| Aldehydes C₄_____do____ | 43.0 | 45.7 |
| Higher oxo-products_____do____ | 5.9 | 6.28 |
| CO_____Nm³/kg__ | 0.054 | 0.041 |
| H₂_____Nm³/kg__ | 0.054 | 0.041 |
| Inert_____Nm³/kg__ | 0.023 | 0.023 |

7.3 kg./hr. of aldehydes C₄ and 1 kg./hr. of higher oxo-products were discharged with a yield in butyric aldehydes of 60% in respect of propylene.

Example 3

The following materials were fed into an experimental reactor, as in the preceding examples, in a continuous operation lasting 4½ hours:

Toluene _____ 5.15 kg./hr.
Propylene _____ 6.4 kg./hr.
Propane _____ 0.33 kg./hr.
CO _____ 3.16 Nm³/hr.
H₂ _____ 3.16 Nm³/hr.
Inert _____ 0.30 Nm³/hr.
Cobalt _____ 10.5 g./kg. propylene.

Temperature average between bottom and top of reactor: 110° C.; pressure 250 atm.; liquid recirculation 250 l./hr. The composition of the liquid was:

|  | At the bottom of the reactor | At the top of the reactor |
|---|---|---|
| Solvent_____percent by weight__ | 34 | 33.5 |
| Propylene_____do____ | 12.7 | 12.3 |
| Propane_____do____ | 2.18 | 2.15 |
| Aldehydes C₄_____do____ | 46.3 | 49.3 |
| Higher oxo-products_____do____ | 4.65 | 4.95 |
| CO_____Nm³/kg__ | 0.0525 | 0.0395 |
| H₂_____Nm³/kg__ | 0.0525 | 0.0395 |
| Inert_____Nm³/kg__ | 0.0197 | 0.0195 |

7.55 kg./hr. of aldehydes C₄ and 0.75 kg./hr. of higher oxo-products were discharged, with a yield in butyric aldehydes of 69% in respect of the propylene introduced.

Example 4

The following materials were fed into a reactor as above described, in a continuous operation lasting 5 hours:

Toluene _____ 5.4 kg./hr.
Propylene _____ 6.2 kg./hr.
Propane _____ 0.29 kg./hr.
CO _____ 3.10 Nm³/hr.
H₂ _____ 3.10 Nm³/hr.
Inert _____ 0.3 Nm³/hr.
Cobalt _____ 10.5 g./kg. propylene.

Temperature conditions, pressure and recirculation as in Examples 2 and 3. The composition of the liquid was:

|  | At the bottom of the reactor | At the top of the reactor |
|---|---|---|
| Solvent_____percent by weight__ | 36.3 | 35.7 |
| Propylene_____do____ | 12.6 | 10.3 |
| Propane_____do____ | 1.87 | 1.85 |
| Aldehydes C₄_____do____ | 43.2 | 46 |
| Higher oxo-products_____do____ | 5.67 | 6.05 |
| CO_____Nm³/kg__ | 0.054 | 0.042 |
| H₂_____Nm³/kg__ | 0.054 | 0.042 |
| Inert_____Nm³/kg__ | 0.0186 | 0.0186 |

7 kg./hr. of aldehydes C₄ and 0.92 kg./hr. of higher oxo-products were discharged, with a yield in butyric aldehydes of 66% in respect of the propylene introduced.

As it can be seen, the yields are not inferior to those obtained at same temperatures and pressures with the known methods which, however, have the inconveniences mentioned.

The results shown for propylene are substantially also applicable for the other olefines.

In comparison with the known processes, the total elimination of the gaseous recirculation according to the present invention does not involve changes (as to temperatures, pressures, synthesis gas composition, catalyst) other than those explicitly mentioned.

We claim:

1. In the continuous process of producing oxygenated compounds by oxo-synthesis in the liquid phase from olefines that are gaseous under normal room conditions, which comprises reacting said olefines with synthesis gas in the presence of cobalt catalyst at temperatures between 90 and 180° C. and at pressures between 100 and 300 atmospheres, the step of supplying the synthesis gas in a quantity at most about equal to the stoichiometric gas-to-olefine proportion and passing the synthesis gas only once through the reaction so that it is present in the reactor discharge only in solution within the liquid phase.

2. The process according to claim 1, wherein the synthesis gas is present substantially only dissolved within the liquid phase throughout the reaction zone.

3. In the method according to claim 2, the step of retaining a layer of gas at the top of the synthesis column.

4. In the continuous process of producing oxygenated compounds by oxo-synthesis in the liquid phase from olefines that are gaseous under normal room conditions, which comprises reacting said olefines with synthesis gas CO+H₂ in the presence of cobalt catalyst at temperatures between 90 and 180° C. and at pressures between 100 and 300 atmospheres, the step of supplying the olefine in an amount larger than the stoichiometric olefine-to-gas proportion, and passing the synthesis gas only once through the reaction so that it is present in the reactor discharge only in solution within the liquid phase.

5. In the continuous process of producing oxygenated compounds by oxo-synthesis in the liquid phase from olefines that are gaseous under normal room conditions, which comprises reacting said olefines with synthesis gas CO+H₂ in the presence of cobalt catalyst at temperatures between 90 and 180° C. and at pressures between 100 and 300 atmospheres, the step of supplying the synthesis gas in a quantity at most about equal to the stoichiometric gas-to-olefine proportion, passing the synthesis gas only once, and maintaining forced recirculation of the liquid.

6. The process according to claim 1, wherein the olefine and the synthesis gas are fed into a reactor at resspectively different heights in respective amounts corresponding substantially to a constant gas-to-olefine ratio throughout the entire reaction mass.

References Cited in the file of this patent

UNITED STATES PATENTS 2,497,303     Gresham _____ Feb. 14, 1950

FOREIGN PATENTS 703,683     Great Britain _____ Feb. 10, 1954

OTHER REFERENCES

Petroleum Refiner (Sherwood), vol. 34, No. 2, Feb. 1955, pgs. 129–135.